US005264228A

United States Patent [19]
Pray et al.

[11] Patent Number: 5,264,228
[45] Date of Patent: Nov. 23, 1993

[54] PREPARATION OF COMPOSITIONS FOR MAKING COCOA BEVERAGES

[75] Inventors: Lee W. Pray, Baldwinsville, N.Y.; Robert L. Scott, Simi Valley, Calif.

[73] Assignee: Nestec S.A., Vevey, Switzerland

[21] Appl. No.: 891,733

[22] Filed: Jun. 1, 1992

[51] Int. Cl.⁵ .................................................. A23P 1/02
[52] U.S. Cl. .................................. 426/285; 426/593; 426/548; 426/631
[58] Field of Search ............... 426/631, 804, 660, 607, 426/548, 659, 285, 591, 593

[56] References Cited

U.S. PATENT DOCUMENTS

| | | | |
|---|---|---|---|
| 3,974,034 | 8/1976 | Horn | 426/661 |
| 4,308,288 | 12/1981 | Hara | 426/285 |
| 4,338,349 | 7/1982 | Franklin | 426/285 |
| 4,554,167 | 11/1985 | Sorge | 426/285 |
| 4,585,657 | 4/1986 | Karwowski | 426/285 |
| 4,741,910 | 5/1988 | Karwowski et al. | 426/285 |
| 4,948,600 | 8/1990 | Zumbe | 426/593 |
| 4,980,181 | 12/1990 | Camp | 426/285 |
| 5,017,392 | 5/1991 | Bombardier | 426/659 |
| 5,051,269 | 9/1991 | Noreille | 426/285 |

*Primary Examiner*—Carolyn Paden
*Attorney, Agent, or Firm*—Vogt & O'Donnell

[57] ABSTRACT

Compositions for preparing cocoa beverages are prepared by mixing cocoa powder, non-fat milk solids, malto-dextrin, an emulsifier and an artificial sweetener to make a mixture which then is ground to disperse the emulsifier and to reduce lumps. The ground mixture then is agglomerated and after a resting period of up to 120 seconds, the agglomerates are dried.

19 Claims, No Drawings

PREPARATION OF COMPOSITIONS FOR MAKING COCOA BEVERAGES

BACKGROUND OF THE INVENTION

The present invention relates to the preparation of cocoa products, more particularly to a process for the preparation of a cocoa beverage powder mix intended to be dispersed in milk to prepare a cocoa or chocolate beverage.

Cocoa beverage powder mixes from which chocolate drinks may be made by dispersing the powder mix in milk usually contain from 2 to 25% cocoa, 0.5 to 2% emulsifier, up to 1% flavour all or most of the remainder being made up of sugar or a filler, such as malto-dextrin, or a mixture of sugar and a filler. A sugar-free cocoa beverage powder mix from which a chocolate drink may be made typically contains cocoa and whey together with small amounts of an emulsifier, such as lecithin, and of an artificial sweetener and flavour. Generally, the ingredients of the cocoa beverage powder mix are batch mixed and then agglomerated to enhance the appearance and performance such as miscibility and flowability. However, when such cocoa beverage powder mixes are dispersed in milk to prepare the beverage, the physical properties are sometimes less then desired.

U.S. Pat. No. 2,850,388 describes chocolate flavoured dry powdered food products of the type intended to be dispersed in water and a process for their manufacture characterised by high wettability and dispersibility in water comprising continuously moistening a mixture of a chocolate flavoured powder and anhydrous milk powder while the material is in dispersed condition, causing the moistened particles of the material, while dispersed in a treatment zone, to contact and permanently adhere together in the form of light moist random aggregates of random shape and of a size substantially greater than the size of the original particles, the aggregates leaving said zone in dispersed condition and having a total moisture content of from 8 to 20%, and then removing excess moisture from the aggregates without any substantial amount of crushing of the same, the final product being a free-flowing granular material. The excess moisture is removed from the aggregates by permitting them to rest without handling for from 1 to 2 minutes, for example on a moving belt until the structures become firm. After the period of rest, the material is less sticky, is relatively free flowing, and the aggregates have sufficient strength for handling and drying without serious breakup or crushing.

In this specification the formation of aggregates will be referred to hereinafter as "agglomeration".

While the process described in U.S. Pat. No. 2,850,388 is effective for chocolate flavoured powdered products of the type intended to be dispersed in water to prepare the beverage, it is not suitable for obtaining desirable physical properties in sugar-free cocoa beverage powder mixes which do not contain malto-dextrin intended to be dispersed in milk to prepare the beverage.

SUMMARY OF THE INVENTION

We have found, surprisingly, that when malto-dextrin is present in sugar-free cocoa beverage powder mixes intended to be dispersed in milk to prepare the beverage, the physical and organoleptic properties are much improved when the mixes are prepared by a process similar to that described in U.S. Pat. No. 2,850,388 e.g., decreased bulk density, improved miscibility and flowability and a creamier texture of the reconstituted beverage.

Accordingly, the present invention provides a process for the preparation of a sugar-free cocoa beverage powder mix containing malto-dextrin intended to be dispersed in milk to prepare the beverage which comprises batch mixing the ingredients, grinding the batch mixed ingredients, wetting with from 10 to 25% by weight of water, agglomerating the wet ground batch mixed ingredients in an agglomeration system, allowing the wetted agglomerated mix to rest for a period of up to 120 seconds and finally drying.

DETAILED DESCRIPTION OF THE INVENTION

The sugar-free cocoa beverage powder mix prepared by the process of this invention may contain as ingredients from 10% to 40% of cocoa powder, from 10% to 35% of a non-fat milk component such as skim milk solids or whey, preferably demineralised whey, from 5% to 35% of malto-dextrin, having a Dextrose Equivalent (DE) of less than 20, and from 0.5% to 3.5% of an emulsifier such as lecithin the remainder comprising artificial sweetener such aspartame and flavouring, all percentages being given by weight based on the total weight of the powder mix.

The mixing of the ingredients is preferably carried out in the absence of water. Preferably a non-fat milk component and malto-dextrin are loaded into a mixer, the artificial sweetener and the emulsifier are then added to the mixer and the ingredients blended, after which the cocoa powder and flavours are added to the mixer and mixed with the other ingredients in the mixer. Alternatively, an artificial sweetener is dry blended with a premix containing the cocoa powder, the flavouring materials and half of a non-fat milk component to give a first preblend, and the other half of the non-fat milk component is mixed with the malto-dextrin and the emulsifier added to give a second preblend which is mixed with the first preblend.

The complete mixed formulations are ground before wetting and agglomerating and it is especially advantageous to ensure that the emulsifier is properly dispersed and to eliminate any lumps.

The mix is conveniently wetted with water at ambient temperature, e.g. at a temperature of from 15° to 35° C. The amount of water is preferably from 12 to 20% and especially from 14 to 18% by weight based on the weight of mix. The agglomeration is advantageously carried out 7 in agglomeration chamber or tower.

The wetting is preferably carried out in the agglomeration system, for instance, by means of an atomising nozzle located in the upper region of an agglomeration chamber or tower, through which the finely atomised water is discharged. The falling mixture acquires the moisture added and after discharging from the agglomeration chamber, it is allowed to rest, preferably on a conveyor belt which may, if desired, be inclined.

The period of rest is conveniently from 5 to 110 seconds, preferably from 10 to 100 seconds and especially from 20 to 90 seconds. This rest period allows the mixture, which is rather soft, to become firmer before the final drying.

The final drying may, for instance, be carried out in a tubular vacuum dryer, but preferably, in a fluid bed dryer, and the final moisture content is usually from 1 to 5%, preferably from 2 to 4% by weight based on the total weight of the mix.

The following Examples further illustrate the present invention.

EXAMPLE 1

33.3 parts of demineralised whey (NUTRITEK 250) and 33.5 parts of malto-dextrin MALTRIN M-100) are loaded into a mixer. 1.00 part of ASPARTAME is preblended with 2.2 parts of lecithin to physically bind the ASPARTAME and provide some thermal protection and this liquid is then dispersed into the mixer and the ingredients are blended. 28.9 parts of cocoa powder and 1.10 part of flavouring materials are added and all the ingredients are mixed. The complete formulation is then ground to ensure that the lecithin is properly dispersed and to eliminate any lumps. The mixture is then fed to a cone shaped agglomeration tower but is first wetted with water by means of an atomising nozzle located in a vertical tube that discharges into the upper region of the agglomeration tower. The wet and sticky agglomerated product, which has acquired 15.6% moisture as it fell is discharged from the lower end of the tower as a wet, sticky mass onto an inclined belt on which it resides for 90 seconds after which time it is converted to dry, crisp and friable agglomerates in a fluid bed dryer. After drying, the final moisture content of the powder mix is 2.37% by weight.

The dry powder mix of the Example has a loose pour density of 316 g/l, a drown time of 26 seconds, and a flowability of ¼ in.

TABLE 1

| POWDER CHARACTERISTICS | | |
|---|---|---|
| | COMPARATIVE EXAMPLE | EXAMPLE 1 |
| BELT MOISTURE | 35.8 | 15.6 |
| FINAL MOISTURE | 9.46 | 2.37 |
| LOOSE POUR DENSITY (GRAMS/LITER) | 376 | 316 |
| DROWN TIME (SECONDS) | 60+* | 26 |
| FLOWABILITY | NOT FREE FLOWING** | ¼ INCH |

*DID NOT DROWN, TEST DISCONTINUED AFTER ONE MINUTE
**WOULD NOT FLOW THRU A ¼ INCH HOLE

The results shown in Table 1 illustrate the reduced density and the improved miscibility and flowability of the powder mix of the present invention. The powder mix of Example 1 when reconstitued with milk also had a creamier texture.

EXAMPLE 2

A process similar to that of Example 1 is carried out except that the mixture is wetted with 18% water and dried to a final moisture content of 3.34%. The loose pour density was 315 g/liter, the drown time was 33 seconds, and the flowability was the same as the product of Example 1.

EXAMPLE 3

A similar procedure to that described in Example 1 is followed except that the belt moisture content is 17.5% and the retention time on the belt is 20 seconds. The product had the same desirable characteristics as the product of Example 1.

EXAMPLE 4

A similar procedure to that described in Example 1 is followed except that the ingredients are mixed in the following manner. The ASPARTAME is dry blended with a premix containing the cocoa powder, the flavouring materials and half the whey to give a preblend (1). The remaining half of the whey is mixed with the malto-dextrin and the lecithin is added to this mixture to give a preblend (2) which is mixed with preblend (1).

We claim:

1. A process for preparing a composition for preparing a cocoa beverage comprising:
   mixing cocoa powder, non-fat milk composition, malto-dextrin, an emulsifier and an artificial sweetener ingredients to obtain an ingredient mixture;
   grinding the mixture to disperse the emulsifier and to reduce lumps to obtain a ground mixture;
   wetting and agglomerating the ground mixture so that the ground mixture is wetted to a moisture content of from 10% to 25% by weight and formed into agglomerates;
   resting the agglomerates for up to 120 seconds; and then
   drying the rested agglomerates.

2. A process according to claim 1 wherein the ingredients are mixed in the absence of water.

3. A process according to claim 1 further comprising, prior to the mixing step, dry blending the emulsifier and artificial sweetener with the non-fat milk composition and malto-dextrin to obtain an ingredient blend and then adding the cocoa powder to the ingredient blend and then mixing to obtain the ingredient mixture.

4. A process according to claim 1 wherein a first dry blend of the artificial sweetener, non-fat milk composition and a second dry blend of the malto-dextrin, emulsifier and non-fat milk solids are mixed to obtain the ingredient mixture.

5. A process according to claim 1 further comprising, prior to the mixing step, dry blending the artificial sweetener with half of the non-fat milk composition to be employed to obtain the ingredient mixture, to obtain a first blend, and dry blending the malto-dextrin and emulsifier and the other half of the non-fat milk composition, to obtain a second blend, and then mixing the first and second blends to obtain the ingredient mixture.

6. A process according to claim 1 wherein the ground mixture is wetted to a moisture content of from 12% to 20% by weight.

7. A process according to claim 1 wherein the ground mixture is wetted and agglomerated in an agglomeration chamber having an atomizing nozzle.

8. A process according to claim 1 wherein the agglomerates are allowed to rest for from 5 secs to 110 secs.

9. A process according to claim 1 wherein the rested agglomerates are dried to a moisture content of from 1% to 5% by weight.

10. A process according to claim 1 wherein the non-fat milk is selected from the group consisting of skim milk solids and whey.

11. A process according to claim 1 wherein the malto-dextrin has a dextrose equivalent of less than 20.

12. A process according to claim 1 wherein a flavor is mixed with the ingredients to obtain the ingredient mixture.

13. A process according to claim 1 wherein, by weight based upon a total weight of the ingredient mixture, the cocoa powder is in an amount of from 10% to 40%, the malto-dextrin is in an amount of from 5% to 35%, the non-fat milk composition is in an amount of from 10% to 35% and the emulsifier is in an amount of from 0,.5% to 3.5%.

14. The product of claim 13.

15. The product of claim 1.

16. A composition for preparing a cocoa beverage comprising agglomerated particles of cocoa powder, malto-dextrin, a non-fat milk composition, an emulsifier, and an artificial sweetener.

17. A composition according to claim 16 wherein, by weight based upon a total weight of the particles, the cocoa powder is in an amount of from 10% to 40%, the malto-dextrin is in an amount of from 5% to 35%, the non-fat milk composition is in an amount of from 10% to 35% and the emulsifier is in an amount of from 0.5% to 3.5%.

18. A composition according to claim 16 further comprising a flavor.

19. A composition according to claim 16 wherein the malto-dextrin has a dextrose equivalent of less than 20.

* * * * *

UNITED STATES PATENT AND TRADEMARK OFFICE
CERTIFICATE OF CORRECTION

PATENT NO. : 5,264,228

DATED : November 23, 1993

INVENTOR(S) : Lee W. PRAY, et al.

It is certified that error appears in the above-identified patent and that said Letters Patent is hereby corrected as shown below:

Column 4, line 57 (line 2 of claim 10), after "milk" insert --composition--.

Column 5, line 2 (line 7 of claim 13), "0,.5%" should be --0.5%--, i.e., delete the comma.

Signed and Sealed this

Seventeenth Day of May, 1994

Attest:

BRUCE LEHMAN

Attesting Officer     Commissioner of Patents and Trademarks